United States Patent [19]

Frauendorf et al.

[11] Patent Number: 5,061,426

[45] Date of Patent: Oct. 29, 1991

[54] PROCESS FOR PRODUCING ELASTANE FIBERS OF HIGH ELASTICITY AND STRENGTH

[75] Inventors: Beatrix Frauendorf, Leverkusen; Siegfried Korte; Carlhans Süling, both of Odenthal; Rudi Dauscher, Dormagen, all of Fed. Rep. of Germany

[73] Assignee: Bayer Aktiengesellschaft, Leverkusen, Fed. Rep. of Germany

[21] Appl. No.: 585,956

[22] Filed: Sep. 21, 1990

[30] Foreign Application Priority Data

Oct. 3, 1989 [DE] Fed. Rep. of Germany ....... 3932949

[51] Int. Cl.$^5$ ................................................ D01F 6/78
[52] U.S. Cl. ............................... 264/205; 264/211.14; 528/52; 528/58; 528/61; 528/64
[58] Field of Search ..................... 528/52, 58, 61, 64; 264/205, 211.14

[56] References Cited

U.S. PATENT DOCUMENTS

| 4,192,940 | 3/1980 | Lindner et al. | 528/370 |
| 4,254,229 | 3/1981 | Schwindo et al. | 521/163 |
| 4,808,691 | 2/1989 | Konig et al. | 528/76 |
| 4,810,749 | 3/1989 | Pinchuk | 264/205 |
| 4,816,529 | 3/1989 | Harris | 521/159 |
| 4,963,310 | 10/1990 | Mitamura | 264/205 |
| 4,964,890 | 10/1990 | Reuter et al. | 210/500.33 |
| 4,978,691 | 12/1990 | Murai et al. | 528/85 |

FOREIGN PATENT DOCUMENTS

| 0000510 | 6/1979 | European Pat. Off. |
| 0292772 | 4/1988 | European Pat. Off. |
| 0321288 | 12/1989 | European Pat. Off. |
| 0364052 | 2/1990 | European Pat. Off. |
| 1964998 | 3/1971 | Fed. Rep. of Germany |

*Primary Examiner*—Hubert C. Lorin
*Attorney, Agent, or Firm*—Connolly and Hutz

[57] ABSTRACT

A process for the production of highly elastic elastane fibers (spandex fibers) based on segmented polyurethane (urea) elastomers having high elasticity and, at the same time, high strength values, balanced elastic properties and excellent thermal and hydrothermal behavior, wherein relatively high molecular weight, carbonate-linked, block-like polyester of polyester etherdiols having molecular weight of 3,300 to 7,000 are reacted with macrodiols with diisocyanates in a molecular ratio of 1:2.5 to 1:4.5 to obtain NCO prepolymers which have NCO contents of 2.10 to 4.0% NCO, then the NCO prepolymer is chain-extended with (cyclo)-aliphatic diamines to fom polyurethane (urea) elastomers.

15 Claims, No Drawings

PROCESS FOR PRODUCING ELASTANE FIBERS OF HIGH ELASTICITY AND STRENGTH

This invention relates to a process for the production of highly elastic elastane fibers (spandex fibers) based on segmented polyurethane (urea) elastomers having high elasticity and, at the same time, high strength values, balanced elastic properties and excellent thermal and hydrothermal behavior, characterized in that, for their production, relatively high molecular weight, carbonate-linked, block-like polyester of polyester etherdiols having molecular weights of 3,300 to 7,000 and preferably 3,500 to 6,500 are reacted as macrodiols with diisocyanates, such as 4,4'-diphenyl methane diisocyanate, in a molecular ratio of 1:2.5 to 1:4.5, preferably using catalysts and in solvents, and the NCO prepolymers obtained, which have NCO contents of 2.10 to 4.0% NCO, are chain-extended with (cyclo)aliphatic diamines, preferably ethylenediamine, and optionally monoamine chain terminators in highly polar solvents to form polyurethane (urea) elastomers.

The present invention also relates to the highly elastic elastane fibers obtainable by the process.

Elastane fibers (known in the USA as spandex fibers) are filaments of which at least 85% by weight consist of segmented polyurethane (urea) elastomers. Elastane fibers are normally produced by initially end-capping a long-chain diol (macrodiol) with a diisocyanate so that a macrodiisocyanate (NCO prepolymer) is obtained. The NCO prepolymer is then reacted in a second step with a chain-extending agent, normally a diamine, to form a high molecular weight polyurethane urea. These polyurethane ureas are synthesized in such a way that the macromolecule has a segment structure, i.e. consists of high-melting, crystalline and low-melting, amorphous segments (hard segments and soft segments). By virtue of their crystallinity and high melting points, the hard segments then act as fixing points of the network and are therefore crucial to the strength of the molded articles produced from the polymers. By contrast, the soft segments, of which the glass temperature must be below the service temperature, are crucial to the elasticity of the elastomers.

Polyester diols and polyether diols are normally used for the synthesis of the soft segments of commercially available elastane fibers. The molecular weights of these polyester or polyether diols are generally of the order of 2,000, so that filaments normally having elasticities of 360 to 500% can also be produced.

Macrodiols having higher molecular weights, for example up to about 4,000, are used for special applications where particularly high elasticities are required. Even higher molecular weights are prescribed in some cases.

However, the disadvantage of these so-called low-modulus elastanes is that, through the increase in the size of the soft segments, the strengths of the fibers produced from these materials distinctly deteriorate so that the fibers are no longer suitable for all textile applications and many of their elastic, thermal and hydrothermal properties also change for the worse.

Theoretically, this strength problem can be overcome by increasing the hard-segment component of the polymer. However, limits are imposed on this method by the fact that, if the molecular ratio of macrodiol to diisocyanate is increased from the normal value of about 1:1.5–1:1.9 to more than 1:2.5, microphase separation and crystallization phenomena occur after chain extension through the precipitation of oligoureas. The resulting elastane solutions are cloudy and, in some cases, show extremely high viscosity or turn to paste in a more or less short time, forming a non-spinnable gel. They can then no longer be processed by spinning.

In addition, the breaking elongation of the elastane filaments is also reduced by the increase in the hard segment component, as described for example in Text.-Praxis Int. 36 (1981), page 842. This effect is of course totally undesirable.

The use of excess diisocyanate in the production of elastane raw materials is known in principle. Thus, according to DE-AS 1 183 196 for example, more excess diisocyanate is added to the reaction mixture after preparation of the NCO prepolymer (by reaction of diisocyanates with the macrodiols in a stoichiometric ratio of 2:1).

The elastanes according to the present invention differ from the segmented polyureas according to DE-AS 1 183 196 inter alia in the fact that the NCO prepolymer is synthesized in an OH:NCO molar ratio of 1:>2.0 by direct reaction of the excess isocyanate with the macrodiol. This ensures that urethane binding links can only be formed to a limited extent, if at all, in the process according to the invention.

To obtain the commercially valuable high elongations in conjunction with favorable elastic, thermal and hydrothermal values, selected long-chain diols of block-like structure with carbonate binding elements are used in accordance with the invention, the long-chain diols having very high molecular weights and the linking of relatively high molecular weight diols by urethane groups being virtually ruled out by simultaneous reaction with diisocyanate in a quantity distinctly exceeding 1:2 (OH:NCO ratio). This eliminates NH.CO.O groups which largely reduce elasticity, although on the other hand the tendency of the long-chain polyesters of polyethers to crystallize is so disturbed by the carbonate groups that stiffening/limiting of elongation by elongating crystallization does not occur to the same extent as in polyesters/polyethers of comparable molecular weight without the carbonate linking elements.

Segmented elastane raw materials are also described, for example, in U.S. Pat. No. 2,929,804, but have soft segments pre-extended by urethane groups, which is a disadvantage so far as their elongation behavior is concerned.

Accordingly, long-chain diols which do not contain any urethane groups and which are not hindered in their extensibility and coiling/uncoiling tendency by hydrogen bridge bonding of these urethane segments are used as components of the polyurethane (ureas) according to the invention. The high viscosity stability of the elastane solutions according to the invention is presumably attributable in large measure to these structural features. However, the (unwanted) tendency of the macrodiols towards crystallization is also distinctly reduced by the specific linking of two diol blocks by carbonate groups.

Elastane raw materials obtainable by chain extension with hydrazine or hydrazine derivatives can contain semi-carbazide hard segments as a result of the synthesis process which is described, for example, in DE-AS 1 123 467. These products differ in their constitution from urea segments. Elastanes of this type show major disadvantages in regard to the thermal deformation of textiles based on polyamide/elastane, i.e. excessively low softening temperatures compared with the urea-containing products according to the invention, particularly those based on ethylenediamine as the (main) extending agent.

The use of relatively long chain polyester diols as a soft segment (for example condensation products of adipic acid and various low molecular weight diols, such as hexane-1,6-diol (H), butane-1,4-diol (B), neopentyl glycol (2,2-dimethylpropane-1,3-diol) (N) or ethylene glycol, having molecular weights of 2,000 to 8,000) is known in principle. However, they show disadvantages in relation to the carbonate-linked block-like polyesters or polyethers according to the invention. Special relatively long-chain polyester and polyether polycarbonate diols have also been described for polyurethanes in general. Thus, DE-OS 3 717 060 describes the production of polyether carbonate diols having molecular weights of 500 to 12,000 and their use for polyurethane plastics, the macrodiols consisting of hexamethylene groups and, optionally, up to 50 mol-% of the hexamethylene groups consisting of penta-, hepta-, octa-, nona- or decamethylene groups which are linked statistically, in alternation or in blocks by ether and carbonate groups.

U.S. Pat. No. 4,463,141 describes polyether carbonate diols corresponding to the following general formula

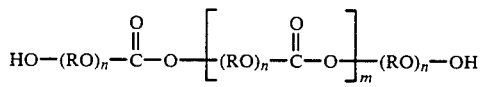

in which $R = -(CH_2)_4-$, $n = 7-45$ and $m = 0-18$, as starting materials for polyurethanes.

DE-AS 1 694 080 describes a carbonate-linked hexane-1,6-diol/adipic acid polyester for the production of crosslinked polyurethanes by the melt casting process. However, on account of their high tendency towards crystallization, relatively long chain macrodiols of this type, which are also described in DE-OS 3 717 060 and in U.S. Pat. No. 4,463,141, are hardly suitable for use as a soft segment in elastane filaments. In addition, U.S. Pat. No. 4,463,141 and 4,476,293 describe the production and use of carbonate-linked polytetramethylene ether diols or copolyether diols on this basis for polyurethane elastomer filaments, the copolyether consisting of at least 20% by weight tetramethylene ether sequences and up to at most 80% by weight of other alkylene ether sequences based on ethylene oxide or propylene oxide. Melt polyurethanes chain-extended by butanediol are described in the Examples.

DE-OS 2 712 435 describes a process for the production of carbonate-linked polyester diols terminated by carbonic acid aryl ester groups corresponding to the following general formula

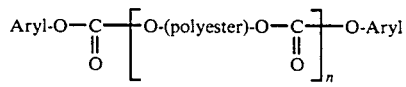

in which
Ar = substituted or unsubstituted $C_{6-18}$ aryl group,
$n = 2-20$.

These polyester diols are not the subject the present invention, although the process may be used for the preparation of intermediate stages for the production of the block macrodiols to be used in accordance with the invention.

High molecular weight poly(ether)ester carbonates having very high molecular weights of more than 20,000 are disclosed in U.S. Pat. No. 4,192,940 and by Hardt et al. in Angew. Chem., 94, 159 et seq. (1982).

It has now surprisingly been found that elastane filaments having special properties, such as high elasticity, improved resistance to hydrolysis and microbial attack, high strengths and improved thermal properties (heat distortion temperature (HDT), hot tear times or fall in tension in hot water) and also improved permanent elongation by comparison with normal elastanes can be produced by reaction of NCO prepolymers of long-chain, relatively high molecular weight diols (macrodiols) having a special block structure, as characterized hereinafter, and molecular weights of >3,300 to 7,000 and preferably 3,500 to 6,500 and diisocyanates (preferably 4,4-diphenyl methane diisocyanates) in high OH:NCO molar ratios of 1:>2.10, preferably 1:2.15–1:4.0 and more preferably 2.5–3.50, more particularly using Lewis acids or Lewis base catalysts, in highly polar solvents, such as dimethyl formamide or—preferably —dimethyl acetamide, and spinning the resulting solutions by methods known per se.

It was completely surprising to find that NCO prepolymers produced in this way can readily be chain-extended in solution with diamines to form polyurethane (ureas) which, in contrast to non-carbonate-linked macrodiols, show no phase separation, are free from gel particles and remain colorless for prolonged periods and are thus accessible to improved spinning and give improved elastomer filament properties.

It is of advantage that, by mixing the block "Desmophens" in certain ratios with one another, optionally in conjunction with non-carbonate-linked macrodiols in quantities of up to 50% by weight, it is possible to establish certain elastic, thermal and hydrothermal properties in the elastane and favorable solubility behavior without losing the high elongation and strength values required for numerous applications of elastane filaments or any of their other favorable properties.

It was also completely surprising to find that, by reacting the carbonate-linked block-like macrodiols to be used in accordance with the invention with diisocyanates in high ratios corresponding to relatively high NCO contents in the NCO prepolymer in the presence of catalysts, not only are short reaction times obtained during formation of the NCO prepolymer, the strengths and elongation of the elastane filaments thus produced can surprisingly be increased to a considerable extent at the same time. The fact that, after chain extension with diamines, elastomer solutions having improved stability in storage are obtained if a catalyst is used was particularly surprising in this regard. In addition, the elastomer solutions obtained where catalysts are used are colorless and remain colorless.

Accordingly, the present invention relates to a process for the production of elastane filaments having high elasticity and favorable thermal and hydrothermal properties by reaction of macrodiols, excess quantities of diisocyanates in solvents to form an NCO prepolymer, chain extension of the NCO prepolymer thus formed with diamines in highly polar solvents and spinning of the solution obtained, optionally with addition of typical additives, characterized in that a) macrodiols which are linked on average by 1 to 4 carbonate groups, are synthesized in blocks from preformed, identical or different polyester diols or from polyester diols and polyether diols and have molecular weights of >3,300 to 7,000, preferably 3,500 to 6,500 and, more preferably, 3,500 to 6,000 and melting points below 50° C. and preferably below 45° C., are reacted b) with organic diisocyanates, preferably aromatic, symmetrical diisocyanates, more particularly 4,4'-diphenyl methane diisocyanate, c) in organic inert solvents, preferably dimethyl formamide and dimethyl acetamide, d) and with addition of 0 to 0.15% by weight, based on the macrodiols a), of catalysts for the OH/NCO reaction, preferably with addition of 0.002 to 0.15% by weight of catalysts and, more preferably, with addition of 0.005 to 0.10% by weight of organotin catalysts, in OH/NCO ratios of 1:>2.10 to 1:4.5, preferably 1:2.15 to 1:4.0 and more preferably 1:2.5 to 1:3.5 so that an NCO prepolymer having an NCO content of <2.10 to 4% NCO (based on solids) and preferably 2.15 to 3.5% NCO in the NCO prepolymer solids is obtained and e) in a following step, the NCO prepolymer thus obtained is reacted in highly polar solvents with (cyclo)aliphatic diamines, preferably ethylenediamine, as principal component, optionally in the presence of chain terminators, to form the viscous polyurethane (urea) elastomer spinning solution which is then spun, preferably by dry spinning.

The carbonate-linked, block-like macrodiols a) according to the invention preferably have block structures corresponding to the following formulae W to Z:

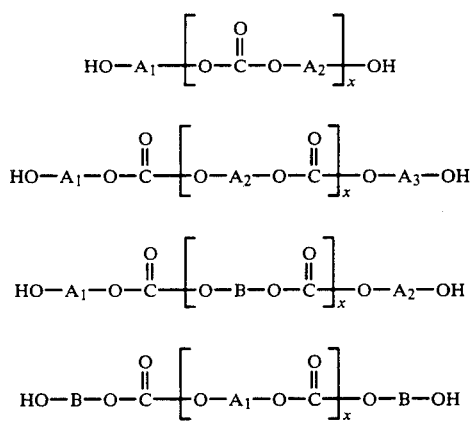

in which $A_1$, $A_2$, and $A_3$ are residues of a preformed polyester diol of dicarboxylic acids and low molecular weight diols having molecular weights of 800 to 3,500 and preferably 1,000 to 3,330 with $A_1 = A_2 = A_3$, $A_1 = A_2 \neq A_3$ and $A_1 = A_3 \neq A_2$, B is the residue of a polyether diol based on polyoxytetramethylene diols or a copolyether thereof having molecular weights of 800 to 3,000 and $x = 1, 2, 3$ or 4, but is selected so that, on average, no more than 4 carbonate groups and preferably <3 carbonate groups are present in the macrodiol a).

The present invention also relates to elastane filaments having high elasticity and favorable thermal and hydrothermal properties which are obtained by the claimed process, preferably by a dry spinning process.

The carbonate-linked polyester/ether block diols used in accordance with the invention are produced as follows:

The principle on which block "Desmophens" are synthesized from polyester diols having the structural formulae W, X (see formula scheme) is described in Example 1a,b).

The principle on which a block "Desmophen" is synthesized from various blocks, namely polyester and polyester diol blocks having the structural formulae Y, Z (see formula scheme), is described in Example 1c) and 1d).

Polyester diols having molecular weights of 800 to 3,500 and preferably 1,000 to 3,300, for example of dicarboxylic acid/diol/polyesters, are suitable for carbonate extension. Valerolactone or caprolactone polyesters or mixed polyesters based on ε-caprolactone, methyl caprolactone or methyl valerolactone are also suitable. Among the dicarboxylic acid polyesters, those containing several alcohols and, optionally, several carboxylic acids are particularly suitable. Mixed polyesters of adipic acid and/or sebacic acid with 2 to 4 different, preferably relatively long-chain ($\geq C_4$) diols are particularly suitable. Particularly suitable diols are hexane-1,6-diol, butane-1,4-diol and neopentyl glycol.

The polyethers used for carbonate extension have molecular weights of 800 to 3,000, preferably 1,000 to 2,500 and more preferably 1,000 to 2,000. Polyethers based on tetrahydrofuran (diols containing oxytetramethylene segments) are preferred. Copolyethers containing oxyethylene or oxypropylene groups in addition to oxytetramethylene groups may also be used.

The polyurethane (ureas) according to the invention are prepared in two stages by the so-called NCO prepolymer process. To this end, the macrodiol is initially reacted with the diisocyanate in solution or in the melt to form an NCO prepolymer. The synthesis of the NCO prepolymers in solvents, particularly in highly polar solvents, such as dimethyl formamide or —preferably—dimethyl acetamide, which are also subsequently used in the chain-extending reaction, is a preferred embodiment. Other suitable solvents are the polar solvents dimethyl sulfoxide, N-methyl pyrrolidone, 1,3-dimethyl-2-imidazolidinone or N-methyl caprolactam. Dimethyl formamide and/or dimethyl acetamide are preferably used.

In a particularly favorable embodiment, the NCO prepolymers are synthesized in the presence of catalysts. Suitable catalysts are Lewis acid catalysts, such as organotin carboxylates, halides, inorganic salts of inorganic acids, insertion catalysts, such as organotin alcoholates, β-dicarbonyl compounds, oxides, mercaptides, sulfides, organoamine tin compounds, phosphine tin compounds, and also Lewis base catalysts, such as tertiary amines, phosphines, pyridines. Dibutyl tin dilaurate (Desmorapid ®Z) or diazabicyclooctane (DABCO ®) are preferably used. Other effective catalysts are salts having an alkaline effect, for example NaOH or sodium phenolate which is used for carbonate transesterification. If the catalyst remains in the block diol, macrodiols of the type in question are highly reactive, even without the addition of other catalysts.

In the synthesis of the elastanes according to the invention, the usual aromatic diisocyanates are optionally used in admixture with small amounts of aliphatic diisocyanates. Particularly useful results are obtained with the following diisocyanates: with 2,4-tolylene diisocyanate and corresponding isomer mixtures, but especially with 4,4'-diphenyl methane diisocyanate and corresponding isomer mixtures containing small amounts of 2,4'- and/or 2,2'-isomers.

Mixtures of aromatic diisocyanates may of course be used. Other suitable mixture components are, for example, (cyclo)aliphatic diisocyanates, such as hexamethylene diisocyanate, isophorone diisocyanate, dicyclohexyl methane diisocyanate or trans-1,4-cyclohexane diisocyanate.

The concentration of the selected catalysts is preferably in the range from 0.15 to 0.002% by weight and more preferably in the range from 0.10 to 0.005% by weight, based on the quantity of the macrodiols a) used. The reaction temperature in the synthesis of the prepolymers in accordance with the invention should not exceed 100° C. and is preferably in the range from 50° to 80° C. It has proved to be of particular advantage to keep the reaction time as short as possible; it is normally between 40 and 70 minutes where the NCO prepolymer is produced in the melt and between 40 and 90 minutes where the NCO prepolymer is produced in solution. If the NCO prepolymer is produced in solution, the concentration of the NCO prepolymer solids is between 50 and 90% and more preferably between 60 and 80%. The presence of the catalysts not only shortens the reaction time, as expected, but—surprisingly—also improves the stability of the solutions against gelation in storage. However, it is best to use the catalyst in a very limited concentration because, if the concentration of catalyst is too high, accelerated depolymerization can occur at high temperatures (for example under the high-temperature conditions used to measure the heat distortion temperature).

In the second stage of the polyurethane (urea) synthesis, the desired urea groups are prepared by a diamine chain-extending reaction with the NCO prepolymers. To this end, the macrodiisocyanates synthesized in the prepolymer stage are reacted in solution with (cyclo)aliphatic diamines e). The following diamines for example are particularly suitable: ethylenediamine, 1,2-propylenediamine, tetramethylenediamine, 1,3-diaminocyclohexane, piperazine, N-methyl ethylenediamine or mixtures of these diamines. Ethylenediamine is preferably used as the predominant chain-extending agent, optionally in admixture with up to 30% per diamines of the above-mentioned type.

The chain-extending reaction is preferably carried out in highly polar solvents, such as dimethyl sulfoxide, N-methyl pyrrolidone, but preferably dimethyl formamide or, more particularly, dimethyl acetamide and preferably in the presence of $CO_2$ (suspended diamine/-carbonic acid salts in the solvents). The desired molecular weight can be adjusted within limits by the presence of a small quantity of monoamines or even monoisocyanates during the chain-extending reaction. Known chain terminators are, for example, diethyl amine, dibutyl amine, N-dialkyl aminoalkylene amines or asymmetrical dimethyl hydrazine. A particular viscosity-stabilizing effect is shown by selected cycloaliphatic or heterocyclic compounds, for example 3-methyl cyclohexyl amine, 3,3,5-trimethyl-1-azacycloheptane (TMD imine), 1-amino-3,3,5-trimethyl cyclohexane, N-cyclohexyl-N-methyl amine or dicyclohexyl amine (cf. German patent application P . . . (Le A 26 864) filed at the same time as the present application). These chain terminators are used in quantities of at most 5 mol-% of the total NCO groups present, their quantities being limited by the desired final viscosity. The compounds claimed in patent application Le A 26 864 filed at the same time as the present application also have a marked viscosity-stabilizing effect on the elastanes containing carbonate-linked block diol. The incorporation of heterocyclic compounds, such as 4-amino-2,2,6,6-tetramethyl pyridine, results in solutions which are relatively stable to viscosity and stable to discoloration. The chain terminators may also be used as isocyanate derivatives of the primary amines mentioned, for example as 3-methyl cyclohexyl isocyanate.

The viscosity of the elastomer solutions required for the preferred dry spinning process is generally in the range from 30 to 500 Pa.sec. at 20° C., the concentration of the elastomer spinning solution normally being between 18 and 40% by weight and preferably between 22 and 38% by weight. In the dry spinning process, the solutions having viscosities of at least 30 Pa.sec. (at 20° C.) may be spun through jets into an approximately 4 to 10 m long duct heated to approximately 150° to 250° C. into which air heated to around 150°–350° C., inert gases, such as nitrogen, or even superheated steam is introduced (cf. applicants' own hitherto unpublished patent application P 39 12 510.6 (Le A 26 748)). Although they generally use less viscous solutions, these spinning processes are less preferred.

The elastane fibers produced by the process according to the invention may contain typical quantities of typical additives serving various purposes, including for example antioxidants, light stabilizers, brightening dyes, pigments, dyeing additives, antistatic agents, flow promoters, abhesive additives, such as magnesium, calcium, lithium, zinc and/or aluminium stearates or zinc oxides, magnesium/zinc mixed oxides or calcium oxides, for stabilizing polyether and polyester elastanes against degradation by chlorine.

EXAMPLE 1

Synthesis of the Relatively High Molecular Weight Block Diols Linked by Carbonate Groups 1a) Two-block polyester
HO<200HN>—OCOO—<200HN>OH

| | |
|---|---|
| Polyester diol 200HN | 1,993 g |
| (based on adipic acid/hexane- | (dehydrated for |
| 1,6-diol/neopentyl glycol | 1 hour in a high |
| (ratio of the diols 65:35) | vacuum at 100° C.) |
| molecular weight 2,000) | |
| Diphenyl carbonate | 107 g |
| Ionol (stabilizer) | 0.3 g |
| Sodium phenolate (catalyst) | 0.12 g |

The starting compounds are melted and mixed under nitrogen for 1.5 hours at 150° C. After cooling to 130° C. a high vacuum is applied and the end product is purified in a high vacuum for periods of 30 minutes at 130° C. 140° C., 150° C., 160° C., 170° C. and finally for 105 minutes at 180° C.

Yield: 1,776 g
Phenol distilled off: 95 g
OH value: 26.6/26.7
Acid value: <0.1
Molecular weight: 4,200 g/mol (according to terminal OH group analysis)

1b) Three-Block Polyester
HO<200HN>—OCOO—<200H-N>—OCOO—<200HN>OH

| | | |
|---|---|---|
| 1 | polyester diol 200HN | 2,982 g |
| | diphenyl carbonate | 642 g |
| | Na phenolate (catalyst) | 0.72 g |

|     | -continued |        |
| --- | --- | --- |
|     | ionol (stabilizer) | 0.45 g |
| II  | polyester diol 200HN | 6,024 g |
|     | Na phenolate | 0.36 g |
|     | ionol | 0.9 g |
| III | toluenesulfonic acid | 1.71 g |
|     |     | 9,652.14 g |

Mixture I

PES 200HN is dehydrated in a high vacuum for 1 hour at 120° C. (cold trap, dry ice) and, after purging with nitrogen, diphenyl carbonate, Na phenolate and ionol are added at 100° C. The mixture is stirred under nitrogen for 1.5 hours at an internal temperature of 150° C., cooled to 110° C. and, after application of a high vacuum, is heated to 120° to 140° C. and distilled until no more phenol is present, followed by purging with nitrogen. Quantity distilled off: 268 g (mainly phenol).

Mixture II is added to mixture I (polyester bis-phenyl carbonate) at 100 ° C. and, after stirring under nitrogen for 1.5 hours at 150° C., the mixture is cooled to 100° C. A high vacuum is then applied and the mixture is distilled for 30 minutes at 130° C., for 30 minutes at 140° C., for 30 minutes at 150° C., for 30 minutes at 160° C., for 30 minutes at 170° C. and for 105 minutes at 180° C. until no more phenol escapes.

After purging with nitirogen, the mixture is allowed to cool to 100° C. Toluenesulfonic acid (mixture III) is then added and, after stirring for 15 minutes, the product is packed in containers while still warm.

Quantity distilled off: 277.6 g
Yield: 8,860 g

The product (sump) is purified in a thin layer evaporator.

OH value: 19.5
Acid value: 0.4
Molecular weight: 5,758 g/mol

1c) Three-Block Ester/Ether/Ester
HO<200HN>—OCOO—<T.100-
0>—OCOO—<200HN>OH

| Stage I) (bisphenyl carbonate intermediate stage) |     |
| --- | --- |
| Terathane ® 1000 (T.1000) (polyether diol based on tetramethylene oxide having a molecular weight of 1,000) | 6,750 g |
| Diphenyl carbonate | 2,889 g |
| Na phenolate | 3.24 g |
| Ionol | 2.07 g |

Terathane®1000 is dehydrated in a high vacuum [0.21–0.35 mbar] for 1 hour at 12° C. After purging with nitrogen, diphenyl carbonate, sodium phenolate and ionol are added at 100° C. After cooling for 1.5 hours at 150° C., the mixture is cooled to 110° C., a high vacuum is applied and phenol is distilled off for 6 hours at 110° C. to 140° C. Quantity distilled off: 1,301 g.

| Stage II) reaction of the polyether bisphenyl carbonate with more (ester)macrodiol |     |
| --- | --- |
| Polyester diol 200HN | 26,406 g |
| Na phenolate | 1.62 g |
| Ionol | 4.05 g |

26,406 g dehydrated polyester diol 200HN, Na phenolate and ionol are added to the end product of mixture I. After stirring under nitrogen for 1.5 hours at 150° C., the mixture is cooled to 100° C. and a high vacuum is applied. Phenol is distilled off for periods of 30 minutes at 130° C., 140° C., 150° C., 160° C. and 170° C. and for 105 minutes at 180° C. Quantity distilled off: 1,221 g. After cooling to 100° C., the reaction is stopped by addition of p-toluenesulfonic acid (7.65 g).

The crude product is purified in a high vacuum (approx. 0.15 mbar) in a thin layer evaporator at 180° C.

OH value: 22.1
Acid value: <0.1
Molecular weight: 5,068 g/mol

1d) Three-Block Ester/Ether/Ester Diol
HO<200HN>—OCOO—<T.200-
0>—OCOO—<200HN>OH

| Stage I) |     |
| --- | --- |
| Terathane ® 2000 (T.2000) (polyether diol based on polytetramethylene oxide having a molecular weight of 2,000) | 1,033 g |
| Diphenyl carbonate | 214 g |
| Na phenolate | 0.24 g |
| Ionol | 0.15 g |

Terathane ® 2000 is dehydrated in a high vacuum for 1 hour at 120° C. After purging with nitrogen, diphenyl carbonate, Na phenolate and ionol are added at 100° C. After stirring for 1.5 hours at 150° C., the mixture is cooled to 110° C., a high vacuum is applied and phenol is distilled off for 45 minutes at 130° C. Quantity distilled off: 98 g.

| Stage II) |     |
| --- | --- |
| Polyester 200HN | 1,995 g |
| Na phenolate | 0.12 g |
| Ionol | 0.3 g |

Mixture II is added to the end product of mixture I. After stirring under nitrogen for 1.5 hours at 150° C., the mixture is cooled to 100° C. and a high vacuum is applied. Phenol is then distilled off for periods of 30 minutes at 130° C., 140° C., 150° C., 160° C. and 170.C and for 105 minutes at 180° C. Quantity distilled off: 109 g. The reaction mixture is then cooled to 100° C. and, after purging with nitrogen, the reaction mixture is stopped by addition of 0.57 g toluenesulfonic acid.

The crude product is purified in a high vacuum (approx. 0.15 mbar) in a thin-layer evaporator at 180° C.

OH value: 18.4/18.7
Acid value: <0.1
Molecular weight: 6,038 g/mol

Example 2 (Comparison)

Polyurethane (Urea) Syntheses 315.9 g dimethyl acetamide (DMAc) and 61.6 g diphenyl methane-4,4'-diisocyanate (MDI) were added to 500 g of the block "Desmophen" HO<200H-N>—OCOO—<T.1000>—OCOO—<200H-N>OH, molecular weight 5,068 g/mol (for synthesis, see Example 1c)), molar OH/NCO ratio=1:2.5. The reaction mixture was then heated with stirring for approx. 130 minutes at 50° C. until the prepolymer had an NCO content of 2.08%.

A mixture of 7.2 g ethylenediamine (EDA) and 1,361 g DMAc was prepared and, after the addition of 15 g $CO_2$, 700 g of the prepolymer solution were added to the carbamate suspension with stirring over a period of 15 minutes. A homogeneous clear elastomer solution having a solids content of 23%, a solution viscosity of 48.3 Pa.s/25°.C. and an intrinsic viscosity of 1.17 dl/g is obtained.

0.3% by weight Mg stearate, 1.% by weight Cyanox ® 1,790, 0.5% by weight Tinuvin ® 622, 0.5% by weight of the polyether siloxane Silwet ® L7607 (a product of Union Carbide Corp., USA) were added to the viscous polymer solution (quantities based on polyurethane solids). The polymer solution was then dry spun.

In Examples 3 to 15, the procedure was as in Example 2 for the production of the polyurethane (urea). A synopsis of these Examples is provided in Table 1 below.

$$\eta_1 = \frac{t_1}{t_0}$$

$t_1$: throughflow time (sec) of the polymer solution $t_0$: throughflow time (sec) of the pure solvent $$\eta = \frac{\ln \cdot \eta_R}{C}.$$

Tenacity was determined in accordance with DIN 53 815 (cN/dtex).

Maximum tensile elongation in % was also measured in accordance with DIN 53 815.

The modulus at 100% and 300% initial elongation was determined at an elongation rate of $4 \times 10^{-3}$ meter per second in cN/dtex.

The residual elongation was determined after

TABLE 1

| | | Prepolymer formation: | | | | | | | Chain extension: | | | | | | |
|---|---|---|---|---|---|---|---|---|---|---|---|---|---|---|---|
| Example | Macrodiol type | quantity (g) | DMAc (g) | MDI (g) | Cat. (%) | T (°C.) | Rct. (mins.) | NCO solid (%) | PP quantity (g) | DMAc (g) | EDA (g) | $CO_2$ (g) | Solids (%) | Sol. v. (Pa.s/ 25° C.) | η (dl/g) |
| 2 Comparison | A | 500 | 316 | 61.6 | — | 50 | 130 | 2.08 | 700 | 1361 | 7.2 | 15 | 23 | 48.3 | 1.17 |
| 3 | A | 500 | 249 | 81.4 | 0.005 | 50 | 45 | 2.97 | 700 | 1567 | 11.16 | 23 | 23 | 47 | 1.26 |
| 4 | A | 500 | 252 | 88.8 | 0.005 | 50 | 90 | 3.33 | 700 | 1572 | 12.6 | 26 | 22.7 | 55.4 | 1.37 |
| 5 Comparison | B | 500 | 306 | 43.5 | — | 50 | 90 | 1.27 | 700 | 1351 | 4.36 | 7 | 22.4 | 86 | 1.15 |
| 6 | B | 500 | 315 | 60.04 | 0.002 | 50 | 90 | 2.15 | 700 | 1363 | 7.4 | 16 | 22.5 | 54 | 1.17 |
| 7 | B | 500 | 244 | 68.3 | 0.005 | 50 | 90 | 2.67 | 600 | 1341 | 8.6 | 14 | 22 | 66.4 | 1.14 |
| 8 | C | 500 | 318 | 64.5 | 0.002 | 50 | 90 | 2.25 | 700 | 1365 | 7.75 | 16 | 22.6 | 133.9 | 1.38 |
| 9 | C | 500 | 222 | 71.6 | 0.05 | 55 | 60 | 2.66 | 700 | 1562 | 10 | 20 | 22 | 48.3 | 1.37 |
| 10 | C | 500 | 248 | 78.2 | 0.1 | 50 | 60 | 2.99 | 700 | 1567 | 11.24 | 23 | 22.8 | 69 | 1.37 |
| 11 | C | 500 | 329 | 85 | 0.002 | 50 | 90 | 3.37 | 700 | 1378 | 11.6 | 24 | 22.8 | 233 | 1.75 |
| 12 | D | 500 | 332 | 89.4 | 0.01 | 50 | 60 | 3.14 | 700 | 1375 | 10.8 | 22 | 22 | 150 | 1.54 |
| 13 | E | 7000 | 2158 | 1630.5 | — | 50 | 75 | 2.16 | 8500 | 22906 | 140.6 | 206 | 20 | 218 | 1.67 |
| 14 Comparison | F | 1200 | 586 | 167.5 | — | 50 | 53 | 1.62 | 1500 | 3315 | 11.88 | 24 | 22 | 65 | 1.22 |
| 15 Comparison | F | 1200 | 642 | 299 | 0.1 | 50 | 30 | 4.34 | 1500 | 3315 | 11.9 | 24 | 22 | 39 | 1.07 |

Explanation of the abbreviations of Table 1:

Macrodiol: ( = carbonate group $-O\overset{\overset{O}{\|}}{C}-O$)

A = HO-200HN T.1000 200HN—OH, MW 5,068, see Example 1c
B = HO-200HN T.2000 200HN—OH, MW 6,038, see Example 1d
C = HO-200HN 200HN 200HN—OH, MW 5,758, see Example 1b
D = HO-200HN 200HN—OH, MW 4,200, see Example 1a
E = polyester diol 200 HN based on adipic acid, hexanediol, neopentyl glycol, OH value 56.3, MW 1,988
F = polyester diol 330HBN based on adipic acid, hexanediol, butanediol, neopentyl glycol, OH value 33.8, MW 3,313
DMAc: dimethyl acetamide
MDI: diphenyl methane-4,4'-diisocyanate
CAT: quantity of the catalyst Desmorapid ® Z in %, based on the macrodiol used
T: reaction temperature
Rct.: reaction time
NCO solids: NCO solids content of the prepolymer
PP quantity: quantity of prepolymer
EDA: ethylenediamine
$CO_2$: quantity of $CO_2$ dry ice
Solids: solids content of the polyurethane urea solution
Sol. v.: solution viscosity of the prepolymer solution
η: intristic viscosity as measured with 5 g PUH solids/l DMAc at 30° C.

Measuring Methods

The variables mentioned in the Examples were determined as follows: the intrinsic viscosities of the elastomers were measured in dilute solution having a concentration c of 0.5 g/100 ml dimethyl acetamide at 30° C. by determination of the relative viscosity $\eta_r$ against the pure solvent and were converted in accordance with the following equation:

$5 \times 300$% elongation with a recovery period of 60 seconds in between.

The heat distortion temperature (HDT), hot tear time (HTT) and fall in tension in hot water (FTHW) are measured by the methods described in Chemiefasern-/Textilindustrie, January 1978, No. 1/78, Vol. 28/80, pages 44–49. Relevant particulars can also be found in DE-OS 2 542 500 (1975).

The same additives as described in detail in Example 2 were added in the same concentrations to the viscous polymer solutions of Examples 3 to 15. All the polymer solutions were dry spun. The textile data of the resulting elastane filaments are summarized in Table 2.

without a catalyst. The elastane solutions produced without a catalyst turned to paste one day after their

TABLE 2

Mechanical and thermal data of the elastane filaments obtained from the polymer solutions described in Table 1

( = carbonate group —OCO—)
$$\underset{O}{\overset{\|}{}}$$

| Example | Macrodiol | Denier (dtex) | Tenacity, actual (cN/detx) | MTE (%) | R100 (cN/ dtex) | R300 (cN/ dtex) | HDT (°C.) | HTT (sec) | ε (%) | OH:NCO | NCO solids (%) | Cat (%) |
|---|---|---|---|---|---|---|---|---|---|---|---|---|
| 2 (Comparison) | HO-200HN T.1000 200HN—OH | 162 | 6.74 | 593 | 0.030 | 0.085 | 167 | 47 | 13 | 1:2.5 | 2.05 | — |
| 3 | HO-200NH T.1000 200HN—OH | 151 | 7.42 | 622 | 0.037 | 0.099 | 180 | 67 | 18 | 1:3.3 | 2.97 | 0.005 |
| 4 | HO-200HN T.1000 200HN—OH | 154 | 6.91 | 600 | 0.042 | 0.114 | 186 | 105 | 18 | 1:3.6 | 3.33 | 0.005 |
| 5 (Comparison) | HO-200HN T.2000 200HN—OH | 177 | 6.47 | 688 | 0.021 | 0.053 | 171 | 32 | 11 | 1:2.1 | 1.27 | — |
| 6 | HO-200HN T.2000 200HN—OH | 160 | 6.81 | 637 | 0.029 | 0.080 | 190 | 123 | 13 | 1:2.9 | 2.15 | 0.002 |
| 7 | HO-200HN T.2000 200HN—OH | 152 | 7.76 | 706 | 0.035 | 0.085 | 188 | 165 | 16 | 1:3.3 | 2.67 | 0.005 |
| 8 | HO-200HN 200HN 200HN—OH | 162 | 4.56 | 543 | 0.043 | 0.114 | 184 | 47 | 11 | 1:2.9 | 2.25 | 0.002 |
| 9 | HO-200HN 200HN 200HN—OH | 175 | 6.26 | 604 | 0.030 | 0.085 | 179 | 54 | 10 | 1:3.3 | 2.66 | 0.05 |
| 10 | HO-200HN 200HN 200HN—OH | 168 | 6.57 | 646 | 0.034 | 0.091 | 176 | 50 | 10 | 1:3.6 | 2.99 | 0.1 |
| 11 | HO-200HN 200HN 200HN—OH | 150 | 6.84 | 652 | 0.046 | 0.110 | 188 | 89 | 15 | 1:3.6 | 3.37 | 0.002 |
| 12 | HO-200HN 200HN—OH | 150 | 5.29 | 522 | 0.061 | 0.116 | 185 | 70 | 15 | 1:3.0 | 3.14 | 0.01 |
| 13 (Comparison) | HO-200HN—OH | 154 | 5.89 | 444 | 0.067 | 0.288 | 175 | 40 | 20 | 1:1.85 | 2,7 | — |
| 15 (Comparison) | HO-33-HBN—OH | 168 | 6.38 | 556 | 0.052 | 0.166 | 178 | 18 | 24 | 1:3.3 | 4.34 | 0.1 |
| 16 (Comparison) | low-modulus commercial product A) | 723 | 2.37 | 649 | 0.031 | 0.070 | 169 | 20 | 13 | | | |

A) LYRCA ®128 Merge 393402N8A
Explanation of the abbreviations in Table 2
Tenacity, actual: breaking strength based on the initial denier
MTE: elongation at break
R100/R300 power on initial 100% and 300% elongation
HDT: heat distortion temperature
HTT: hot tear time
ε: residual elongation after 5× 300% elongation
Cat: quantity of the catalyst Demorapid ® Z in %, based on the macrodiol used.

The excellent properties of the block Desmophens used in accordance with the invention are clearly apparent from Table 2, elongations of more than 700% being achieved. The breaking strengths obtained are also higher than those of a conventional elastane (Example 13, Comparison). (Elongation at break was measured with compensation of the displacement of the filaments from the clamp under high forces).

Excellent heat stabilities (HDT up to 190° C., HTT up to 165 seconds) were also obtained by the process according to the invention. Despite the large hard segment component, the residual elongations remain below 20% and are more favorable than in cases where comparable macrodiols without the block structure characteristic of the invention are used.

However, the particular advantage of the prepolymer process according to the invention is also quite clear (short reaction times, with catalyst, high MDI content). Thus, despite the large quantity of MDI, both breaking strength (tenacity, actual), the moduli (R100, R300) and elongation at break (MTE) are unexpectedly all increased.

Another advantage of the production process according to the invention is that the solutions remain colorless. If the large quantities of MDI are reacted in the absence of a catalyst, the solution quickly turns yellow.

All the elastane solutions produced by the prepolymer process according to the invention remained stable for 2 to 5 days longer than elastane solutions produced production because of the high MDI contents.

A relatively high molecular weight polyester diol having a molecular weight of 3,300 was used for comparison in Examples 14 and 15. In Example 14, the polyester was used under standard conditions without a catalyst with an OH:NCO ratio of 1:1.85. The prepolymer process according to the invention, catalyst, high MDI content, was used in Example 15. It is clear that, although the MTE, strength and moduli increase in relation to Example 14, the high MDI content causes a high residual elongation of 24%. In addition, where this polyester diol (molecular weight 3,300) is used, the urethane undergoes re-cleavage caused by the catalyst. This means that the prepolymer process according to the invention can only be effectively used for a macrodiol having a molecular weight above 3,300.

TABLE 3

| | Fall in tension in hot water (FTHW) | | |
|---|---|---|---|
| Example | (A) in air ($10^{-3}$ cN/dtex) | (B) in water/ 95° C. ($10^{-3}$ cN/dtex) | (C) in air, no load, permanent elongation (%) |
| 2 (Comp.) | 25.3 | 14.3 | 36 |
| 3 | 31.7 | 18 | 41 |
| 4 | 34.1 | 18.8 | 42 |
| 5 (Comp.) | 17 | 9.7 | 40 |
| 7 | 29.2 | 17.4 | 34 |
| 8 | 33.1 | 21.7 | 30 |
| 9 | 24.7 | 15.8 | 33 |

TABLE 3-continued

Fall in tension in hot water (FTHW)

| Example | (A) in air (10⁻³ cN/dtex) | (B) in water/ 95° C. (10⁻³ cN/dtex) | (C) in air, no load, permanent elongation (%) |
|---|---|---|---|
| 10 | 27.2 | 19 | 31 |
| 11 | 45.6 | 29.7 | 22 |
| 16 (Comp.) | 26.9 | 14.2 | 40 |
| Low-modulus commerical product A) | | | |

A) LYCRA ® 128 Merge 393 402 N8A

Table 3 shows another particular advantage of the elastanes produced by the prepolymer process according to the invention over commercially available low-modulus types (Example 16). This particular advantage is that the elastanes according to the invention show improved behavior in regard to the fall in tension in hot water.

Determination of Fall in Tension in Hot Water (RTHW)

Two loops of the filament to be measured with a length between groups of 100 mm (biassing weight 0.0009 cN/dtex) are stretched by 100% in a standard conditioning atmosphere. The filament tension (cN/dtex) obtained after 2 minutes is measured (value (A) in Table 3). The filament stretched by 100% is then immersed in water at 95° C. The tension obtained after 3 minutes is determined (valve (B) in Table 3). The filament is then removed from the water bath and left for 2 minutes at room temperature. The filament clamped in the grips is then relaxed until free from tension. The residual elongation remaining is determined (value (C) in Table 3). The elastane is better, the higher the values (A) and (B) and the lower the value (C).

We claim:

1. A process for the production of elastane filaments by reaction of macrodiols, excess quantities of diisocyanates in solvents to form an NCO prepolymer, chain extension of the NCO prepolymer thus formed with diamines in highly polar solvents and spinning of the solution obtained, optionally with addition of typical additives, wherein
   a) macrodiols which are linked on average by 1 to 4 carbonate groups, are synthesized in blocks from preformed, identical or different polyester diols and have molecular weights of >3,300 to 7,000, and melting points below 50° C., are reacted
   b) with organic diisocyanates,
   c) in organic inert solvents,
   d) and with addition of 0.002 to 0.15% by weight, based on the macrodiols a), of catalysts for the OH/NCO reaction, in OH/NCO ratios of 1:>2.10 to 1:4.5, so that an NCO prepolymer having an NCO content of <2.10 to 4% NCO, based on solids, is obtained and
   e) in a following step, the NCO prepolymer thus obtained is reacted in highly polar solvents with (cyclo)aliphatic diamines, as principal component, optionally in the presence of chain terminators, to form the viscous polyurethane (urea) elastomer spinning solution which is then spun.

2. A process as claimed in claim 1 wherein the polyester diols and polyether diols in a) have a molecular weight of 3,500 to 6,500.

3. A process as claimed in claim 1 wherein the polyester diols and polyether diols in a) have a molecular weight of 3,500 to 6,000.

4. A process as claimed in claim 1 wherein the organic diisocyanates b) are aromatic, symmetrical diisocyanates.

5. A process as claimed in claim 1 wherein the organic diisocyanate b) is 4,4'-diphenyl methane diisocyanate.

6. A process as claimed in claim 1 wherein the inert solvent c) is dimethyl formamide or dimethyl acetamide.

7. A process as claimed in claim 1 wherein the catalyst d) is 0.005 to 0.10% by weight, based on the macrodiols a), of organotin catalysts.

8. A process as claimed in claim 1 wherein the OH/NCO ratio is 1>2:15 to 1:4.0.

9. A process as claimed in claim 1 wherein the OH/NCO ratio is 1:2.5 to 1:3.5.

10. A process as claimed in claim 1 wherein the NCO prepolymer from d) has an NCO content of 2.15 to 3.15%.

11. A process as claimed in claim 1 wherein the (cyclo) aliphatic diamine in e) is ethylene diamine.

12. A process as claimed in claim 1 wherein the spinning solution is spun by dry spinning.

13. A process as claimed in claim 1 wherein the carbonate-linked block-like macrodiols a) have block structures corresponding to formulae W to Z:

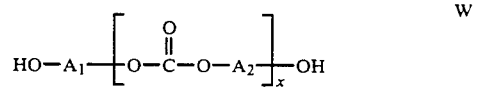

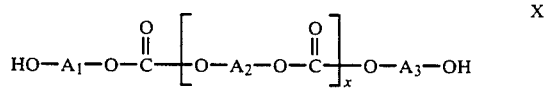

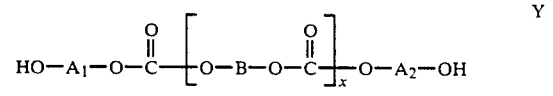

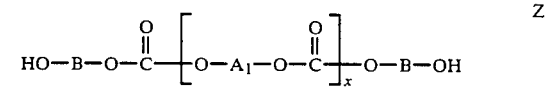

in which
   $A_1$, $A_2$, and $A_3$ are residues of a preformed polyester diol of dicarboxylic acids and low molecular weight diols having molecular weights of 800 to 3,500 with $A_1=A_2=A_3$, $A_1=A_2\neq A_3$ and $A_1=A_3\neq A_2$,
   B is the residue of a polyether diol based on polyoxytetramethylene diols or a copolyether thereof having molecular weights of 800 to 3,000 and
   $x=1,2,3$ or 4, but is selected so that on average no more than 4 carbonate groups are present in the macrodiol a).

14. A process as claimed in claim 13 wherein the molecular weight of the low molecular weight diols is 1,000 to 3,330.

15. A process as claimed in claim 13 wherein the value for x is such that less than 3 carbonate groups are in the macrodiol a).

* * * * *